United States Patent
Kusase

(10) Patent No.: US 8,067,874 B2
(45) Date of Patent: Nov. 29, 2011

(54) MOTOR APPARATUS INCLUDING LUNDELL MOTOR HAVING LUNDELL-TYPE ROTOR

(75) Inventor: Shin Kusase, Oobu (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 12/926,832

(22) Filed: Dec. 13, 2010

(65) Prior Publication Data

US 2011/0084634 A1 Apr. 14, 2011

Related U.S. Application Data

(62) Division of application No. 12/368,522, filed on Feb. 10, 2009, now Pat. No. 7,919,900.

(30) Foreign Application Priority Data

Feb. 29, 2008 (JP) .................................. 2008-049833

(51) Int. Cl.
*H02K 1/27* (2006.01)
(52) U.S. Cl. ...................................................... 310/263
(58) Field of Classification Search .............. 310/156.66, 310/263; *H02K 1/22, 1/24, 1/27*
See application file for complete search history.

(56) References Cited

U.S. PATENT DOCUMENTS

| 5,132,581 | A | 7/1992 | Kusase |
| 5,825,116 | A | 10/1998 | Ishikawa |
| 5,903,084 | A | 5/1999 | Asao et al. |
| 5,955,807 | A | 9/1999 | Kajiura et al. |
| 6,404,096 | B1 * | 6/2002 | Kometani et al. ............. 310/263 |
| 6,531,803 | B2 * | 3/2003 | Kometani et al. ............. 310/263 |
| 6,680,557 | B2 | 1/2004 | Kusase |
| 6,707,277 | B2 | 3/2004 | Nishimura et al. |
| 6,847,150 | B2 * | 1/2005 | Kometani et al. ............. 310/263 |
| 6,882,081 | B2 | 4/2005 | Isoda et al. |

(Continued)

FOREIGN PATENT DOCUMENTS

JP   10-304633   11/1998

(Continued)

OTHER PUBLICATIONS

Japanese Office Action dated Nov. 2, 2009, issued in corresponding Japanese Application No. 2008-049833, with English translation.

(Continued)

*Primary Examiner* — Tran Nguyen
(74) *Attorney, Agent, or Firm* — Nixon & Vanderhye PC

(57) ABSTRACT

A Lundell motor apparatus controls a field current passed to a rotor field coil and an armature stator coil current to generate a required torque. When the field current is If, the armature current is Ia, a d-axis inductance is Ld, a q-axis inductance is Lq, a q-axis current as a q-axis component of the armature current is Iq, a d-axis current as a d-axis component of the armature current is Id, a field torque is Tf, a field flux is φf, a reluctance torque is Tr, and a combined torque of the field torque and the reluctance torque is ΣT, the d-axis current Id is passed to the stator coil within a phase angle range where the combined torque ΣT becomes larger than the field torque Tf to generate reluctance torque Tr which is equal to (Ld−Lq)Id·Iq in addition to the field torque Tf.

5 Claims, 6 Drawing Sheets

U.S. PATENT DOCUMENTS

| | | |
|---|---|---|
| 6,995,493 B2 | 2/2006 | Isoda et al. |
| 7,408,280 B2 | 8/2008 | Ooiwa |
| 7,420,314 B2 | 9/2008 | Fujita et al. |
| 2006/0290232 A1 | 12/2006 | Fujita et al. |
| 2007/0278895 A1 | 12/2007 | Kusase |
| 2009/0009025 A1 | 1/2009 | Fujita et al. |
| 2009/0218907 A1 | 9/2009 | Kusase |

FOREIGN PATENT DOCUMENTS

| | | |
|---|---|---|
| JP | 2000-116170 | 4/2000 |
| JP | 2002-142488 | 5/2002 |
| JP | 2005-130656 | 5/2005 |
| JP | 2005-192345 | 7/2005 |
| JP | 2007-006638 | 1/2007 |
| JP | 2007-329989 | 12/2007 |

OTHER PUBLICATIONS

Japanese Office Action dated Jun. 24, 2010, issued in corresponding Japanese Application No. 2008-049833, with English translation.

* cited by examiner

MOTOR APPARATUS INCLUDING LUNDELL MOTOR HAVING LUNDELL-TYPE ROTOR

CROSS-REFERENCE TO RELATED APPLICATIONS

This application is a Division of application Ser. No. 12/368,522, filed Feb. 10, 2009 (now issued as U.S. Pat. No. 7,919,900), which claims priority from and is based on Japanese Patent Application No. 2008-49833 filed on Feb. 29, 2008, the contents of all of which are hereby incorporated by reference.

BACKGROUND OF THE INVENTION

1. Field of the Invention

The present invention relates to a motor apparatus including a Lundell motor having a Lundell-type rotor.

2. Description of Related Art

Lundell-type rotors are widely used for vehicle alternators required to be capable of adjusting power generation voltage thereof by controlling a field current. The Lundell-type rotors have a structure including a rotor core constituted by a cylindrical boss section and a plurality of claw-poles which extend from both axial end surfaces of the boss section radially outward at a predetermined circumferential pitch, and then extend in the axial direction such that the claw-poles extending from one of the end surfaces alternate with the opposed claw-poles extending from the other end surface, and also including a field coil wound around the boss section.

There is also known a magnet-equipped Lundell-type rotor in which each claw-pole is provided with permanent magnets at both its circumferential sides in order to strengthen the field flux thereof. For example, Japanese patent Application Laid-open No. 2007-329989 describes a vehicle alternator including such a magnet-equipped Lundell-type rotor invented by the same inventor as named in the present application.

Also, Japanese patent Application Laid-open No. 2005-130656 and Japanese patent Application Laid-open No. 2005-192345 describe a vehicle-mounted motor or a vehicle alternator including such a magnet-equipped Lundell-type rotor.

It is also known to utilize a reluctance torque due to the difference between a d-axis inductance Ld and a q-axis inductance Lq for performing torque adjustment in a conventional IPM motor (Interior Permanent Magnet motor) or a SYRM (Synchronous Reluctance Motor) having a rotor core with the projecting magnetic pole characteristic.

Generally, vehicle-mounted motors are required to be torque adjustable over a wide rotation range. However, the above conventional IPM motor has a problem in that its efficiency is low in a high speed range, because a field-weakening control has to be performed in the high speed range. Also, the SYRM has problems in that its output torque is small for its body size because the SYRM uses only the reluctance torque, and its efficiency is low because of the necessity to generate the d-axis flux.

While on the other hand, the foregoing motor including a Lundell-type rotor can be used as an excellent torque-adjustable motor for a vehicle, because its field torque Tf (=field flux $\Phi f \times$ q-axis current Iq) can be adjusted by controlling its field current If irrespective of the rotational speed thereof.

However, the motor including a Lundell-type rotor has a problem in that its torque cannot be changed rapidly, because of the large inductance of its field coil. In addition, the motor including a Lundell-type rotor has further problems in that the body size per output torque is large compared to the IPM motor, and its efficiency is low because of the necessity to pass a field current to the field coil.

SUMMARY

The present exemplary embodiment provides a Lundell motor apparatus comprising:

a stator on which a stator coil constituted by a plurality of phase windings is wound; and a Lundell-type rotor disposed so as to face an inner circumferential surface of the stator with an electromagnetic gap therebetween and be rotatable around an axial direction thereof;

the Lundell-type rotor including a rotor core made of soft magnetic material and constituted by a cylindrical boss section, a plurality of claw pole sections which extend from both axial ends of the rotor core at a predetermined circumferential pitch and then extend in the axial direction such that the claw pole sections extending from one of the axial ends alternate with the claw pole sections extending from the other of the axial ends in a circumferential direction of the Lundell-type rotor, and a field coil wound around the boss section, the Lundell motor apparatus further comprising a control section which controls a field current passed to the field coil and an armature current passed to the stator coil in order to generate a required torque, wherein, when the field current is If, the armature current is Ia, a d-axis inductance is Ld, a q-axis inductance is Lq, a q-axis current as a q-axis component of the armature current is Iq, a d-axis current as a d-axis component of the armature current is Id, a field torque is Tf, a field flux is $\phi f$, a reluctance torque is Tr, and a combined torque of the field torque and the reluctance torque is $\Sigma T$, the control section passes the d-axis current Id to the stator coil within a phase angle range in which the combined torque $\Sigma T$ becomes larger than the field torque Tf in order to generate the reluctance torque Tr which is equal to $(Ld-Lq)Id \cdot Iq$ in addition to the field torque Tf.

The present exemplary embodiment also provides a Lundell motor apparatus comprising:

a stator on which a stator coil constituted by a plurality of phase windings is wound; and a Lundell-type rotor disposed so as to face an inner circumferential surface of the stator with an electromagnetic gap therebetween and be rotatable around an axial direction thereof;

the Lundell-type rotor including a rotor core made of soft magnetic material and constituted by a cylindrical boss section, a plurality of claw pole sections which extend from both axial ends of the rotor core at a predetermined circumferential pitch and then extend in the axial direction such that the claw pole sections extending from one of the axial ends alternate with the claw pole sections extending from the other of the axial ends in a circumferential direction of the Lundell-type rotor, and a field coil wound around the boss section, the Lundell motor apparatus further comprising a control section which controls a field current passed to the field coil and an armature current passed to the stator coil in order to generate a required torque, wherein the Lundell-type rotor further includes a d-axis pole section made of soft magnetic material and disposed in a gap between each circumferentially adjacent two of the claw pole sections, and a permanent magnet magnetized in the circumferential direction and interposed between a radial end portion of at least one of the each circumferentially adjacent two of the claw pole sections and the d-axis pole section.

The present exemplary embodiment also provides a Lundell motor apparatus comprising:

a stator on which a stator coil constituted by a plurality of phase windings is wound; and a Lundell-type rotor disposed so as to face an inner circumferential surface of the stator with an electromagnetic gap therebetween and be rotatable around an axial direction thereof;

the Lundell-type rotor including a rotor core made of soft magnetic material and constituted by a cylindrical boss section, a plurality of claw pole sections which extend from both axial ends of the rotor core at a predetermined circumferential pitch and then extend in the axial direction such that the claw pole sections extending from one of the axial ends alternate with the claw pole sections extending from the other of the axial ends in a circumferential direction of the Lundell-type rotor, and a field coil wound around the boss section, the Lundell motor apparatus further comprising a control section which controls a field current passed to the field coil and an armature current passed to the stator coil in order to generate a required torque, the Lundell-type rotor further including a cylindrical section made of soft magnetic material having an inner circumferential surface which radial outer end surfaces of the claw pole sections are fitted to, and a plurality of permanent magnets housed in a plurality of magnet housing holes formed in the cylindrical section, each of the magnet housing holes is located between a q-axis section defined by a first radial end portion of the cylindrical section radially outward of one of each circumferentially adjacent two of the claw pole sections and a d-axis section defined by a portion of the cylindrical section located between the first portion and a second radial end portion of the cylindrical section radially outward of the other of the each circumferentially adjacent two of the claw pole sections, each two of the permanent magnets located on circumferentially opposite sides of each d-axis pole section being magnetized in circumferentially opposite directions, each two of the permanent magnets located on circumferentially opposite sides of each q-axis pole section being magnetized in circumferentially the same direction.

The present exemplary embodiment also provides a Lundell motor apparatus comprising:

a stator on which a stator coil constituted by a plurality of phase windings is wound; and a Lundell-type rotor disposed so as to face an inner circumferential surface of the stator with an electromagnetic gap therebetween and be rotatable around an axial direction thereof;

the Lundell-type rotor including a rotor core made of soft magnetic material and constituted by a cylindrical boss section, a plurality of claw pole sections which extend from both axial ends of the rotor core at a predetermined circumferential pitch and then extend in the axial direction such that the claw pole sections extending from one of the axial ends alternate with the claw pole sections extending from the other of the axial ends in a circumferential direction of the Lundell-type rotor, and a field coil wound around the boss section, the Lundell motor apparatus further comprising a control section which controls a field current passed to the field coil and an armature current passed to the stator coil in order to generate a required torque, the Lundell-type rotor further including a permanent magnet disposed in contact with each of circumferentially opposite sides of each claw pole section, and a cylindrical section made of soft magnetic material disposed so as to be fitted to the claw pole sections, the cylindrical section being formed with a plurality of groove portions which open to radially inward to house the claw pole sections and the permanent magnets, each two of the permanent magnets located on circumferentially opposite sides of each claw pole section being magnetized in the same circumferential direction, each two of the permanent magnets circumferentially adjacent to each other across from the cylindrical section being magnetized in circumferentially opposite directions.

According to the present exemplary embodiment, there is provided a Lundell motor apparatus which can generate large torque per body size, and rapidly adjust output torque in a high rotational speed region.

Other advantages and features of the invention will become apparent from the following description including the drawings and claims.

PREFERRED EMBODIMENTS OF THE INVENTION

First Embodiment

Figure 1:
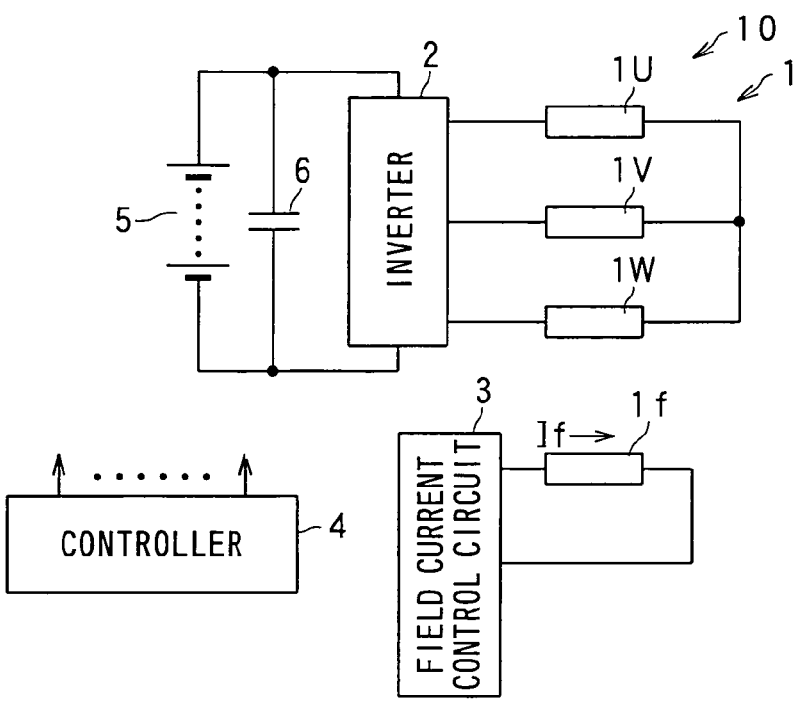
FIG. 1 is a circuit diagram of a motor apparatus including a motor having a Lundell-type rotor of a first embodiment of the invention.
Figure 2:
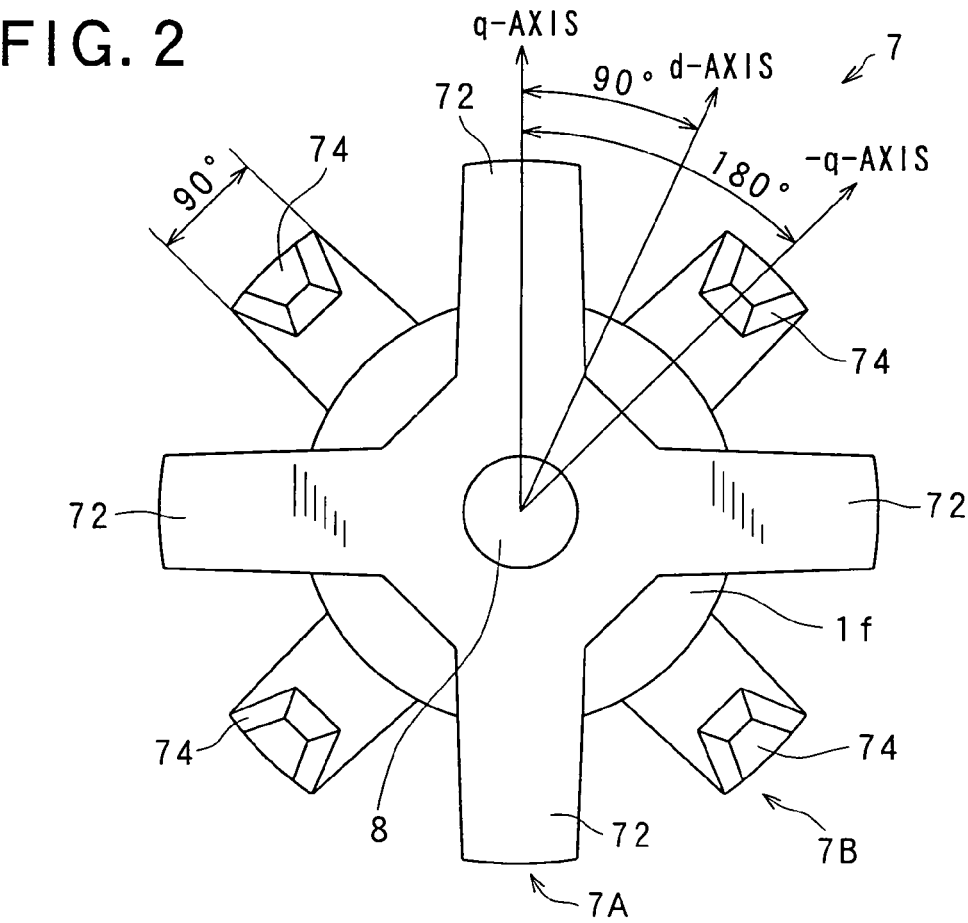
FIG. 2 is an axial front view of the Lundell-type rotor of the motor of the first embodiment.
Figure 3:
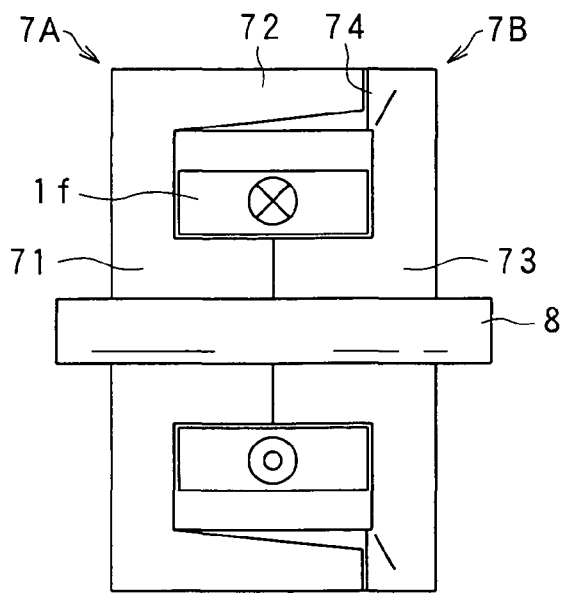
FIG. 3 is an axial cross-sectional view of a Lundell-type rotor of a motor of a second embodiment of the invention.

FIG. 1 is a circuit diagram of a motor apparatus including a motor having a Lundell-type rotor (may be referred to as "Lundell motor" hereinafter), FIG. 2 is an axial front view of a rotor of the Lundell motor, and FIG. 3 is an axial cross-sectional view of this rotor of the Lundell motor.

In FIG. 1, the reference numeral 1 denotes the Lundell motor, 2 denotes a three-phase inverter, 3 denotes a field current control circuit 3, 4 denotes a microcomputer-based controller for controlling the inverter 2 and the field current control circuit 3 on the basis of a torque command received from the outside, 5 denotes a vehicle battery, and 6 denotes a smoothing capacitor.

The Lundell motor 1 includes an armature coil (stator coil) 10 wound around a stator core (not shown), and a field coil 1f. The armature coil 10 is constituted of a U-phase coil 1U, a V-phase coil 1V and W-phase coil 1W which are star-connected to a common connection point. A field current If flowing through the field coil 1f is controlled by the field current control circuit 3, and phase currents flowing through the armature coil 10 are controlled by the inverter 2. The controller 4 determines a three-phase current to be passed to the armature coil 10 in accordance with a rotational angle of a rotor 7 of the motor 1 detected by a rotation angle sensor (not shown) and the torque command received from the outside, and outputs a control signal to instruct the inverter 2 to pass the determined three-phase current to the armature coil 10. The controller 4 also determines the field current If to be passed to the field coil if, and instructs the field current control circuit 3 to pass the determined field current If to the field coil 1f.

Since the circuit structure of the Lundell motor 1 is basically the same as that of a conventional field-coil-type synchronous motor, further explanation is omitted.

Next, the rotor 7 of the motor 1, which is a Lundell-type rotor is explained in detail with reference to FIGS. 2 and 3.

The Lundell-type rotor 7 is constituted of half cores 7A and 7B. The half core 7A, which is made of soft magnetic material, includes a cylindrical boss section 71 fixed to a rotation shaft 8, four claw pole sections 72 which extend radially outward from an axial outer end of the boss section 71 at a circumferential pitch of 90 degrees and then extend in the axial direction toward the other half core 7B. The half core 7B, which is made of soft magnetic material, includes a cylindrical boss section 73 fixed to the rotation shaft 8, four claw pole sections 74 which extend radially outward from an axial outer end surface of the boss section 73 at a circumferential pitch of 90 degrees and then extend in the axial direction toward the other half core 7A. The two boss sections 71 and 73 contact with each other at their axial inner end surfaces. Hence, the Lundell-type rotor 7 is an 8-pole rotor. As explained above, each of the claw pole sections 72 and 74 includes the radially extending portions which extend radially outward from the boss section 71 or 73, and the axially extending portions which axially extend from the radially extending portions. In the following explanation, the axially extending portion may be referred to as the claw pole section. Since the Lundell-type rotor as described above is well known, further explanation is omitted.

The circumferential width of each of the claw pole sections 72 and 74 is in a range of 60-90 degrees in electrical angle. In this embodiment, the circumferential width of each of the claw pole sections 72 and 74 is set to 90 degrees in electrical angle.

Accordingly, in this embodiment, since a circumferential gap between circumferentially adjacent two of the claw pole sections can be as large as 90-120 degrees, it is possible to make the d-axis inductance Ld small, and to make the q-axis inductance Lq large to such an extent that the motor 1 has a reluctance torque sufficiently large in a practical point of view although it is a Lundell motor. Incidentally, when the circumferential width of the claw pole section is below the above described range, the q-axis inductance Lq and the q-axis flux reduce, and when the circumferential width of the claw pole section is above the above described range, the difference between the q-axis inductance Lq and the d-axis inductance Ld reduces, because the circumferential gap between circumferentially adjacent two of the claw pole sections reduces. In both cases, since the projecting magnetic pole ratio reduces, the reluctance torque reduces.

When the d-axis inductance is Ld, the q-axis inductance is Lq, the q-axis current (a q-axis component of the armature current Ia) is Iq, the d-axis current (a d-axis component of the armature current Ia) is Id, the field current is If, the field torque is Tf, the field flux is $\Phi f$, and the reluctance torque is Tr, the controller 4 determines the phase angle $\theta$ (tan $\theta$=Iq/Id) at which the sum of the field torque and the reluctance torque as a combined torque $\Sigma T$ ($\Phi f \cdot Iq + (Ld-Lq) \cdot Iq \cdot Id$) becomes its maximum with reference to a map showing a relationship among the rotational speed, phase angle $\theta$ and the maximum value of the combined torque $\Sigma T$, and then calculates the q-axis current Iq and the d-axis current Id such that the combined torque $\Sigma T$ at the determined phase angle $\theta$ and the rotational speed becomes equal to a high-frequency component of the torque command received from the outside. This makes it possible to reduce the armature current Ia (=Iq+jId) to reduce copper loss, while ensuring the required torque.

According to this embodiment, since the d-axis current Id is passed to the stator coil to generate the reluctance torque Tr, it is possible to output large torque per motor body size compared to the conventional motor apparatus in which the d-axis current is not passed to the stator coil. However, it should be noticed that the d-axis current Id has to be passed within a phase angle range in which the combined torque $\Sigma T$ become larger than the field torque Tf.

In addition, in this embodiment, the field current If is adjusted so as to be nearly proportional to variation of a low-frequency component of the torque command received from the outside. This makes it possible to reduce the copper loss due to the field current when both the value and variation of the torque command are small.

Second Embodiment

Figure 4:
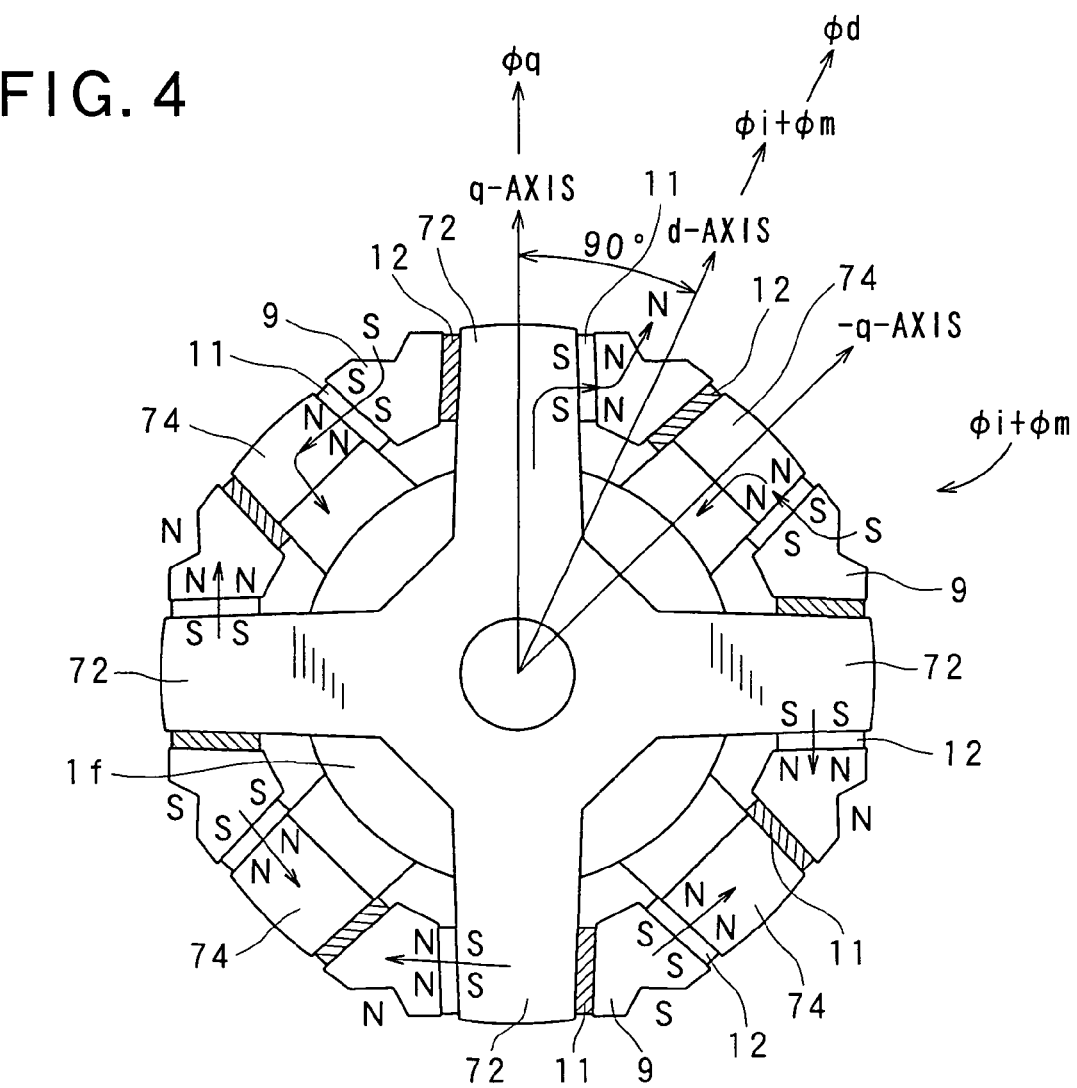
FIG. 4 is an axial front view of the Lundell-type rotor of the motor of the second embodiment.
Figure 5:
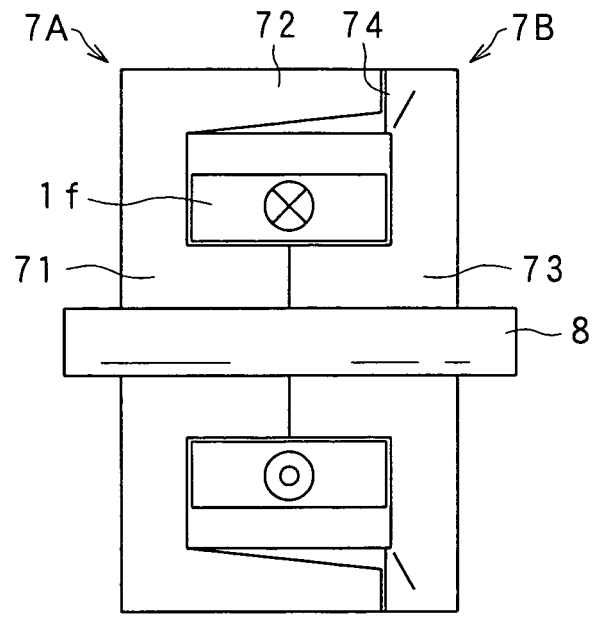
FIG. 5 is an axial cross-sectional view of the Lundell-type rotor of the motor of the second embodiment.

Next, a second embodiment of invention is described with reference to FIGS. 4 and 5. FIG. 4 is an axial front view of a rotor of a Lundell motor of the second embodiment, and FIG. 5 is an axial cross-sectional view of this rotor of the Lundell motor.

The second embodiment differs from the first embodiment in that it additionally includes a d-axis pole section 9 made of soft magnetic material, a tabular permanent magnet 11, and a non-magnetic metal plate 12, which are provided in each of the circumferential gaps between the claw pole sections 72 and the claw pole sections 74.

The claw pole sections 72 extend from the axial front side to the axial rear side, and the claw pole sections 74 extend from the axial rear side to the axial front side. The d-axis pole section 9 is located in the circumferential gap between the claw pole section 72 and the claw pole section 74 which are adjacent in the circumferential direction. The radial position of the radial end surface of the d-axis pole section 9 is nearly the same as those of the radial end surfaces of the claw pole sections 72 and 74. The permanent magnet 11 is interposed between the clockwise side of the radial outer end portion of each of the claw pole sections 72 and 74 and the counterclockwise side of the d-axis pole section 9. The non-magnetic metal plate 12 is interposed between the counterclockwise side of the radial outer end portion of each of the claw pole sections 72 and 74 and the clockwise side of the d-axis pole section 9. In FIG. 4, although the clockwise side and the counterclockwise side of each of the permanent magnet 11 and the non-magnetic metal plate 12 are shown to extend parallel radially outward, actually they are inclined to each other to allow the circumferential widths of the claw pole sections 72 and 74 to increase in the direction toward radially outward. Accordingly, centrifugal forces generated in the d-axis pole section 9, permanent magnet 11, and non-magnetic metal plate 12 are applied to the claw pole sections 72 and 74. The permanent magnet 11 adjacent to the claw pole section 72 is magnetized such that it has S pole on the side of the claw pole section 72, and N pole on the side of the d-axis pole section 9. On the other hand, the permanent magnet 11 adjacent to the claw pole section 74 is magnetized such that it has N pole on the side of the claw pole section 74, and S pole on the side of the d-axis pole section 9. The field coil 1f magnetizes the claw pole sections 72 to N pole, and claw pole sections 74 to S pole.

In the Lundell motor of this embodiment having the above described structure, most of the field flux Φf generated by the field current If flowing through the field coil 1f and entering the claw pole section 72 through the boss section 71 is bent from the side of the radial outer end portion of the claw pole section 72 to the side of the circumferentially odd numbered d-axis pole section 9 by being absorbed by the permanent magnet 11. Likewise, most of the field flux Φf flowing from the stator coil to the circumferentially even numbered d-axis pole section 9 is absorbed by the permanent magnet 11 to enter the radial end portion of the claw pole portion 74 and then flow into the boss section 73.

As explained above, in this embodiment, the sum of the field generated by the field coil 1f and the field generated by each permanent magnet 11 produces the field flux Φf, and this field flux Φf is bent in one circumferential direction so that the d-axis pole section 9 becomes a gateway of the field flux Φf, that is, becomes the d-axis. Accordingly, the radial outward surface of each of the claw pole sections 72 and 74 become the q-axis.

Hence, according to this embodiment, it is possible to strengthen the field flux produced by the field current If by the provision of the permanent magnets, and to increase the difference between the d-axis inductance Ld and the q-axis inductance Lq. That is, in this embodiment, since the d-axis pole sections 9 are isolated from the claw pole sections 72 and 74 by the permanent magnets 11 and the non-magnetic plates 12, the d-axis inductance Ld can be reduced, and the claw pole sections 72 and 74 made of soft magnetic material can produce the large q-axis inductance Lq. As a result, since field torque Tf (=Φf·Iq) caused by the strengthened field flux Φf and the large reluctance torque Tr (=(Ld−Lq) Id·Iq) generate the large combined torque, the motor body size can be reduced.

Incidentally, as shown in FIG. 4, when the flux produced by the field current is Φi and the flux produced by the permanent magnet is Φm, the field flux Φf can be regarded to be equal to (Φi+Φm). It is needless to say that the q-axis flux Φq is equal to Lq·Iq, and the d-axis flux Φd is equal to Ld·Id.

Third Embodiment

Figure 6:
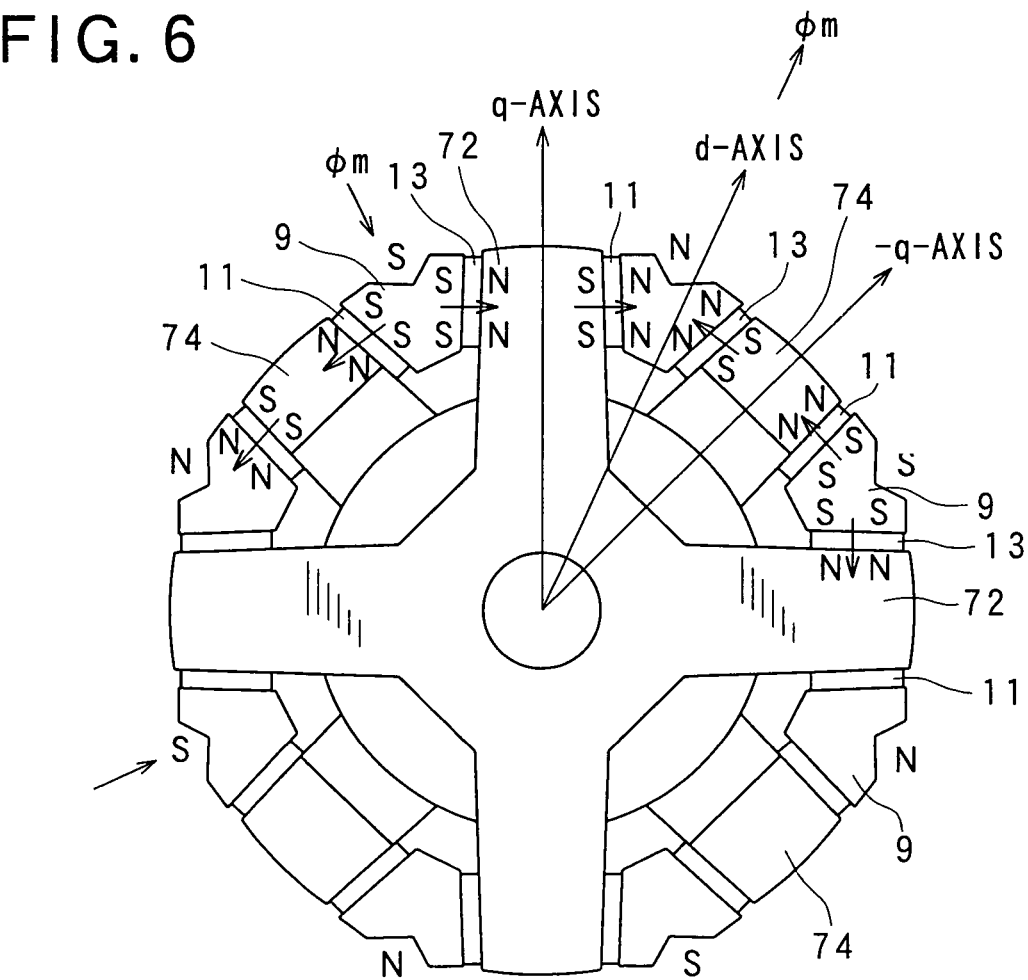
FIG. 6 is an axial front view of a Lundell-type rotor of a motor of a third embodiment of the invention.
Figure 7:
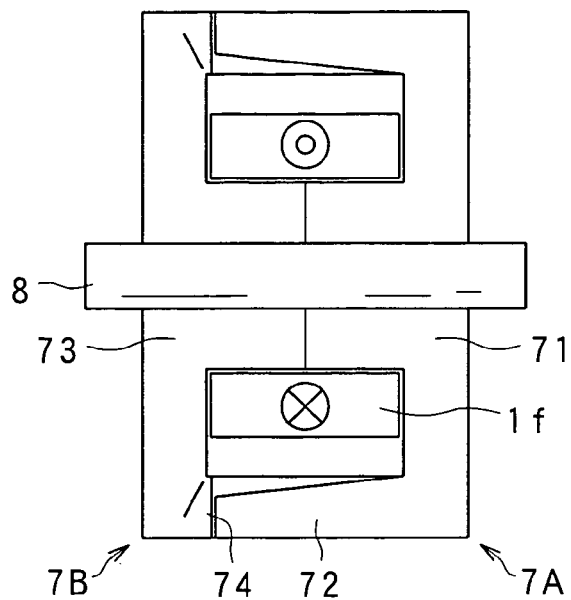
FIG. 7 is an axial cross-sectional view of the Lundell-type rotor of the motor of the third embodiment.

Next, a third embodiment of invention is explained with reference to FIGS. 6 and 7. FIG. 6 is an axial front view of a rotor of a Lundell motor of the third embodiment, and FIG. 7 is an axial cross-sectional view of this rotor of the Lundell motor.

The third embodiment differs from the second embodiment in that the non-magnetic plates 12 are replaced by tabular permanent magnets 13. As shown in FIG. 6, the permanent magnet 13 is magnetized in the opposite direction to the permanent magnet 11 which is across the d-axis pole section 9 from this permanent magnet 13, or in the same direction as the permanent magnet 11 which is across the claw pole section 72 or 74 from this permanent magnet 13.

In the Lundell motor of this embodiment having the above described structure, most of the field flux generated by the field current If flowing through the field coil 1f and entering the claw pole section 72 through the boss section 71 is bent from the side of the radial outer end portion of the claw pole section 72 to the side of the circumferentially odd numbered d-axis pole section 9 by being absorbed by the permanent magnet 11. Likewise, most of the field flux flowing from the stator coil to the circumferentially even numbered d-axis pole section 9 is absorbed by the permanent magnet 11 to enter the radial end portion of the claw pole portion 74 and then flow into the boss section 73.

The permanent magnets 11 and 13 pass the field flux, which is generated only by the permanent magnets 11 and 13 and circulates through the stator core, d-axis pole section 9, permanent magnet 11, claw pole section 72, permanent magnet 13, d-axis pole section 9 and stator core, from the d-axis to the d-axis of the stator core. Accordingly, since the field flux flowing through the stator core increases, the field flux torque Tf can be increased.

Hence, according to this embodiment, it is possible to strengthen the field flux Φf, and to increase the difference between the d-axis inductance Ld and the q-axis inductance Lq. That is, in this embodiment, since the d-axis pole section 9 is isolated from the claw pole sections 72 and 74 by the permanent magnets 11 and 13, the d-axis inductance Ld can be reduced, and the claw pole sections 72 and 74 made of soft magnetic material can produce the large q-axis inductance Lq. As a result, since field torque Tf (=Φf·Iq) caused by the strengthened field flux Φf and the large reluctance torque Tr (=(Ld−Lq) Id·Iq) generate the large combined torque, the motor body size can be reduced.

Fourth Embodiment

Figure 8:
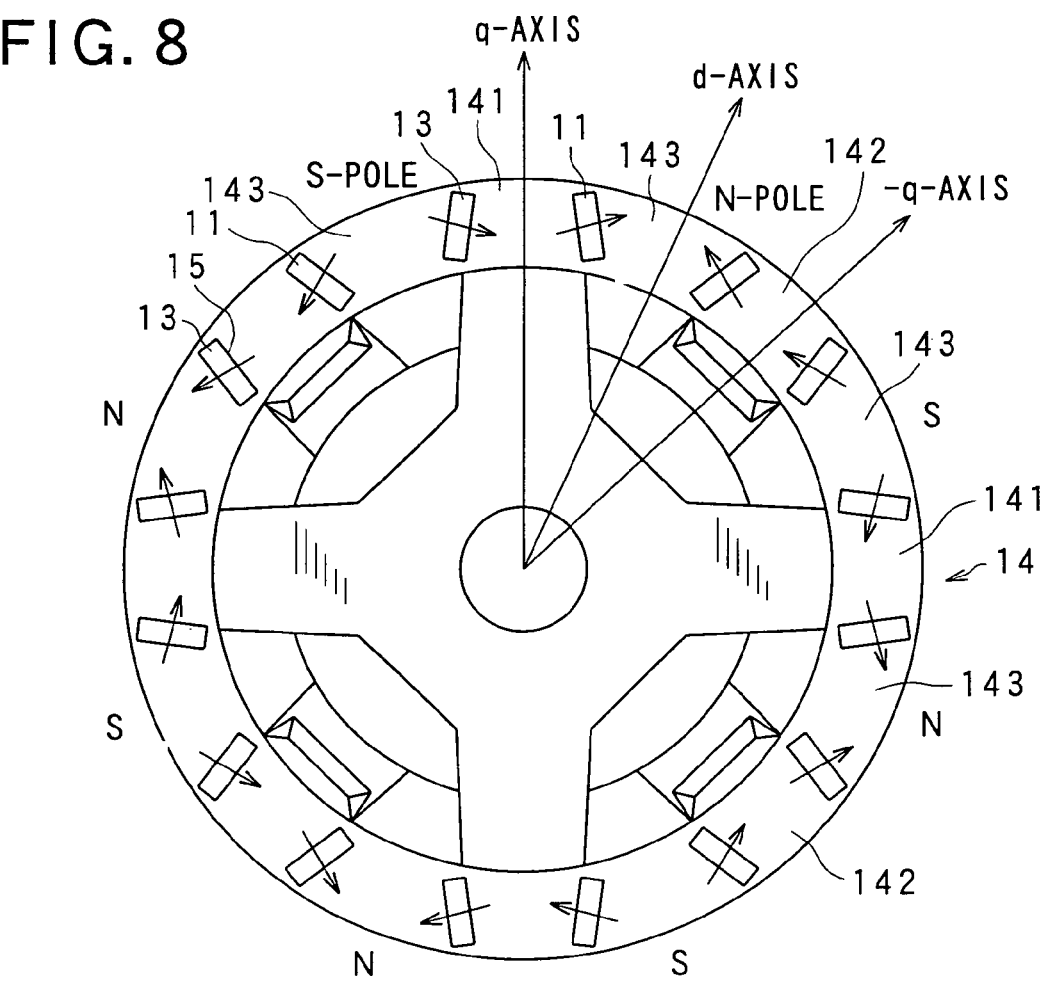
FIG. 8 is an axial front view of a Lundell-type rotor of a motor of a fourth embodiment of the invention.
Figure 9:
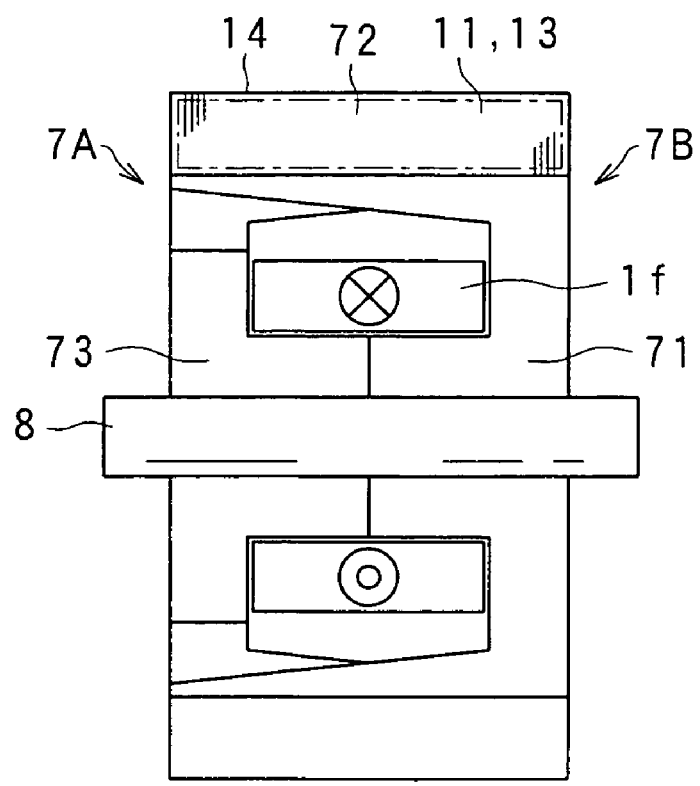
FIG. 9 is an axial cross-sectional view of the Lundell-type rotor of the motor of the fourth embodiment.

Next, a fourth embodiment of invention is explained with reference to FIGS. 8 and 9. FIG. 8 is an axial front view of a rotor of a Lundell motor of the fourth embodiment, and FIG. 9 is an axial cross-sectional view of this rotor of the Lundell motor.

The fourth embodiment differs from the first embodiment in that the rotor thereof is provided with a soft magnetic cylindrical section 14 disposed such that the claw pole sections 72 and 74 are covered by the soft magnetic cylindrical section 14 with their radial end surfaces being in contact with the soft magnetic cylindrical section 14, and the permanent magnets 11 and 13 are housed in magnet housing holes 15 formed so as to penetrate through the soft magnetic cylindrical section 14 in the axial direction. The positions and magnetized directions of the permanent magnets 11 and 13 in this embodiment are the same as those of the third embodiment. The soft magnetic cylindrical section 14 is formed by laminating electromagnetic steel plates in the axial direction.

The soft magnetic cylindrical section 14 is sectioned into a first portion 141 located radially outward of the claw pole sections 72, a second portion 142 located radially outward of the claw pole sections 74, and a third portion 143 located between the first and second portions.

When the radial widths of the permanent magnets 11 and 13 are sufficiently large, the third portion 143 of the soft magnetic cylindrical section 14 serves the same function as the d-axis pole sections 9 shown in FIG. 6, the first portion 141 is equivalent to the radial outward portions of the claw pole sections 72 shown in FIG. 6, and the second portion 142 is equivalent to the radial outward portions of the claw pole sections 74 shown in FIG. 6.

Accordingly, the fourth embodiment can provide the same advantages as provided by the third embodiment. Furthermore, since the soft magnetic cylindrical section 14 provides excellent resistance to centrifugal force, the fourth embodiment exhibits excellent high-speed characteristics compared to the third embodiment.

Fifth Embodiment

Figure 10:
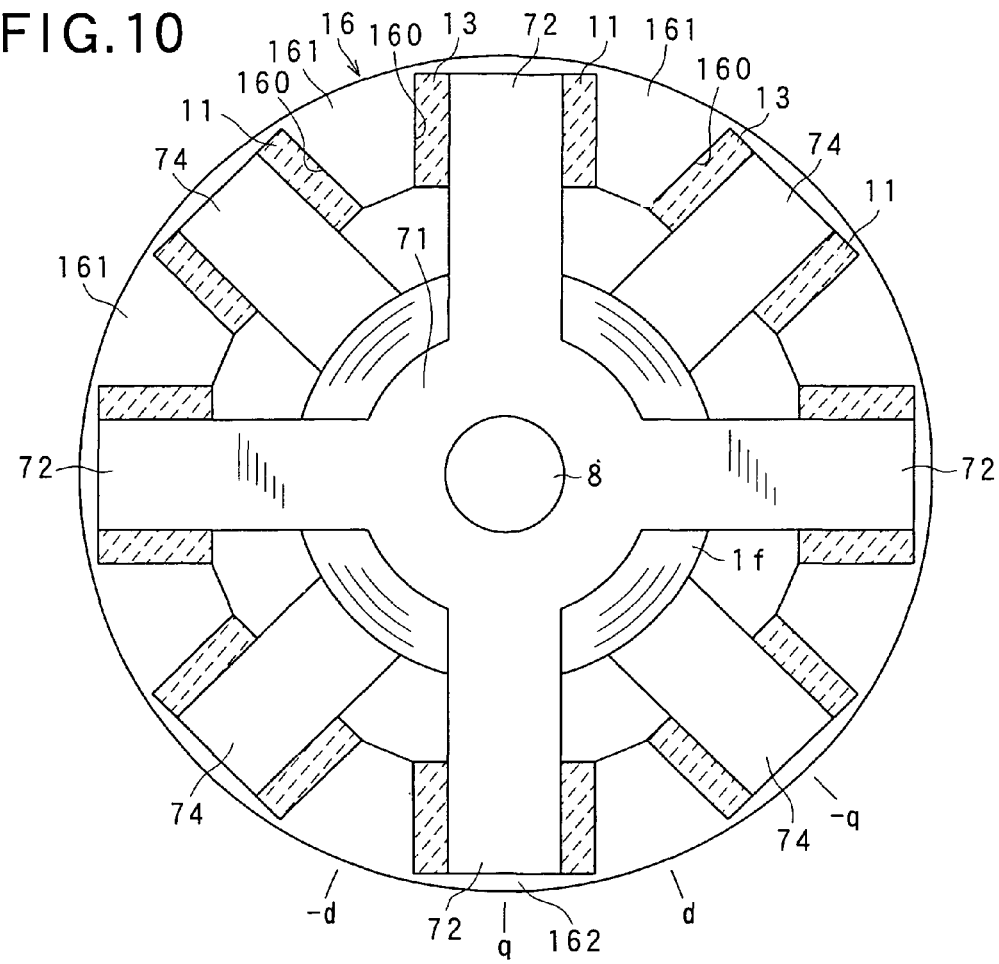
FIG. 10 is an axial front view of a Lundell-type rotor of a motor of a fifth embodiment of the invention.

Next, a fifth embodiment of invention is explained with reference to FIG. 10. FIG. 10 is an axial front view of a rotor of a Lundell motor of the fifth embodiment.

The fifth embodiment differs from the fourth embodiment in that the rotor thereof is provided with a soft magnetic cylindrical section 16 disposed such that claw pole sections 72 and 74 are covered by the soft magnetic cylindrical section 16 with their radial end portions being in contact with the soft magnetic cylindrical section 16, and the radial end portions of the claw pole sections 72 and 74 and the permanent magnets 11 and 13 are housed in groove portions 160 formed in the soft magnetic cylindrical section 16 so as to open to the radially inner side. The positions and magnetized directions of the permanent magnets 11 and 13 in this embodiment are the same as those of the third and fourth embodiments. The soft magnetic cylindrical section 16 is formed by laminating electromagnetic steel plates in the axial direction.

The groove portions 160 are formed at an electrical angle pitch of pi. Accordingly, a d-axis pole section 161 which serves the same function as the d-axis pole section 9 and the third portion 143 of the soft magnetic cylindrical section 14 is provided between circumferentially adjacent two of the groove portions 160. The reference numeral 162 denotes a thin connecting portion which extends along the circumferential direction so as to be in contact with the radial outward portions of the permanent magnets 11 and 13 and the claw pole sections 72 and 74. The connecting portion 162 connects circumferentially adjacent two of the d-axis pole sections 161.

The soft magnetic cylindrical section 16 of this embodiment serves the same function as the soft magnetic cylindrical section 14 of the fourth embodiment shown in FIG. 8. The soft magnetic cylindrical section 16 reduces leakage flux flowing along the sides of the permanent magnets 11 and 13 more than the soft magnetic cylindrical section 14 does.

Accordingly, the fifth embodiment provides the same advantages as provided by the fourth embodiment. In addition, since the soft magnetic cylindrical section 16 provides excellent resistance to centrifugal force, the fifth embodiment exhibits excellent high-speed characteristics compared to the third embodiment. Furthermore, since the diameter of the Lundell-type rotor of this embodiment can be made smaller than that of the fourth embodiment, the body size of the motor can be made smaller than that of the fourth embodiment.

Figure 11:
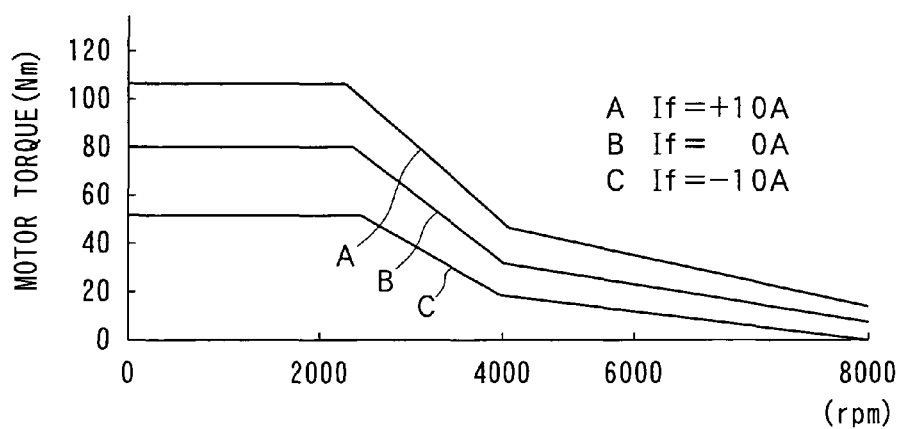
FIG. 11 is a graph showing torque-rotational speed-field current characteristics of the motor of the first embodiment of the invention.

FIG. 11 is a graph showing torque-rotation speed-field current characteristics of the Lundell motor of the foregoing first embodiment obtained through simulation. In the simulation, it is assumed that the stator coil generates magnetomotive force of 1600 AT (100 ampere rms, 16 turns) per one pole, the circumferential width of the claw pole sections is 90 degrees in electrical angle, and the field coil 1$f$ is a 100-turn coil. In this graph, the curve A shows a case where the field current is 0 A, B shows a case where the field current is 10 A, and C shows a case where the field current is –10 A. The phase angle θ was set to such a position that the combined torque becomes maximum. It can be understood from FIG. 11 that the motor output torque can be adjusted by adjusting the field current, and also that a fairly large motor output torque can be obtained by the reluctance torque even when the field current If is 0.

The above explained preferred embodiments are exemplary of the invention of the present application which is described solely by the claims appended below. It should be understood that modifications of the preferred embodiments may be made as would occur to one of skill in the art.

What is claimed is:

1. A Lundell motor apparatus comprising:
   a stator having a stator coil with a plurality of phase windings;
   a Lundell-type rotor disposed so as (a) to face an inner circumferential surface of said stator with an electromagnetic gap therebetween and (b) to be rotatable around an axial direction thereof;
   said Lundell-type rotor including a rotor core made of soft magnetic material and including a cylindrical boss section, a plurality of claw pole sections which extend from both axial ends of said rotor core at a predetermined circumferential pitch and then extend in said axial direction such that said claw pole sections extending from one of said axial ends alternate with said claw pole sections extending from the other of said axial ends in a circumferential direction of said Lundell-type rotor, and a field coil wound around said boss section,
   a control section which controls a field current passed to said field coil and an armature current passed to said stator coil in order to generate a torque,
   wherein a circumferential width of said claw pole sections is between 60 and 90 degrees in electrical angle.

2. The Lundell motor apparatus according to claim 1, wherein,
   when said field current is If,
   said armature current is Ia,
   a d-axis inductance is Ld,
   a q-axis inductance is Lq,
   a q-axis current as a q-axis component of said armature current is Iq,
   a d-axis current as a d-axis component of said armature current is Id,
   a field torque is Tf,
   a field flux is φf,
   a reluctance torque is Tr, and
   a combined torque of said field torque and said reluctance torque is ΣT,
   said control section is configured to pass said d-axis current Id to said stator coil within a phase angle range where said combined torque ΣT becomes larger than said field torque Tf to generate said reluctance torque Tr which is equal to (Ld−Lq)Id·Iq in addition to said field torque Tf.

3. The Lundell motor according to claim 1, wherein, when said field current is if,
   said armature current is Ia,
   a d-axis inductance is Ld,
   a q-axis inductance is Lq,
   a q-axis current as a q-axis component of said armature current is Iq,
   a d-axis current as a d-axis component of said armature current is Id,
   a field torque is Tf,
   a field flux is φf,
   a reluctance torque is Tr,
   combined torque of said field torque and said reluctance torque is ΣT, and
   a phase angle at which said combined torque ΣT becomes maximum is θ,
   said control section contains a map representing a relationship among (a) a rotational speed of said Lundell-type rotor, (b) said combined torque ΣT and (c) said phase angle θ, and said control section being configured to utilize said relationship to set said q-axis current Iq and d-axis current Id such that said combined torque ΣT determined based on said map becomes equal to a high frequency component of a torque command received and inputted to said control section.

4. The Lundell motor according to claim 3, wherein:
said control section is configured to adjust said field current If by a value which is substantially proportional to variation of a low frequency component of said torque command.

5. The Lundell motor according to claim 1, wherein:
said Lundell-type rotor includes a d-axis pole section made of soft magnetic material which is disposed in a gap between each circumferentially adjacent two of said claw pole sections, and a permanent magnet magnetized in said circumferential direction is interposed between a radial end portion of at least one of said circumferentially adjacent two of said claw pole sections and said d-axis pole section, said permanent magnet being located between said d-axis pole section and each circumferentially adjacent two of said claw pole sections.

* * * * *